(12) United States Patent
Al-Gouhi et al.

(10) Patent No.: US 11,555,571 B2
(45) Date of Patent: Jan. 17, 2023

(54) AUTOMATED FLOWLINE LEAK SEALING SYSTEM AND METHOD

(71) Applicant: Saudi Arabian Oil Company, Dhahran (SA)

(72) Inventors: Alwaleed Abdullah Al-Gouhi, Dhahran (SA); Abdulaziz Khalid Alsufayan, Dhahran (SA); Salvador Alejandro Ruvalcaba Velarde, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 253 days.

(21) Appl. No.: 16/788,799

(22) Filed: Feb. 12, 2020

(65) Prior Publication Data
US 2021/0247014 A1    Aug. 12, 2021

(51) Int. Cl.
F16L 55/165    (2006.01)
F16L 55/163    (2006.01)
(Continued)

(52) U.S. Cl.
CPC ......... F16L 55/1657 (2013.01); F16L 55/163 (2013.01); F16L 55/18 (2013.01); F16L 55/38 (2013.01); F16L 2101/60 (2013.01)

(58) Field of Classification Search
CPC ... F16L 55/163; F16L 55/165; F16L 55/1657; F16L 55/28; F16L 55/38; F16L 2101/60;
(Continued)

(56) References Cited

U.S. PATENT DOCUMENTS

| 774,519 A | 11/1904 | Greenaway |
| 2,508,761 A | 5/1950 | Kroboth |

(Continued)

FOREIGN PATENT DOCUMENTS

| CA | 1212312 | 10/1986 |
| GB | 2241443 | 4/1991 |

(Continued)

OTHER PUBLICATIONS

PCT International Search Report and Written Opinion in International Appln. No. PCT/US2021/017050, dated Apr. 26, 2021, 16 pages.

(Continued)

Primary Examiner — Kenneth Rinehart
Assistant Examiner — Richard K. Durden
(74) Attorney, Agent, or Firm — Fish & Richardson P.C.

(57) ABSTRACT

Automated flowline leak sealing can be implemented as a flowline sealing tool assembly. A sealing sleeve is configured to be positioned within a flowline with a circumferential leak. The sealing sleeve includes a pair of ends configured to be positioned on either side of the circumferential leak. A pair of sealing elements are attached to the pair of ends, respectively, and are configured to seal the pair of ends to an inner wall of the flowline on either side of the circumferential leak. A deployment tool includes a hollow cylinder configured to be inserted into and retracted from an inner volume defined by the sealing sleeve. The deployment tool is configured to activate the pair of sealing elements to seal the pair of ends to the inner wall of the flowline on either side of the circumferential leak in response to being retracted from the inner volume.

20 Claims, 6 Drawing Sheets

(51) Int. Cl.
*F16L 55/18* (2006.01)
*F16L 101/60* (2006.01)
*F16L 55/38* (2006.01)

(58) Field of Classification Search
CPC ... E21B 33/126; E21B 33/1265; E21B 33/136
USPC .......................................................... 138/97
See application file for complete search history.

(56) References Cited

U.S. PATENT DOCUMENTS

| | | | |
|---|---|---|---|
| 2,519,116 A | 8/1950 | Crake | |
| 2,671,510 A | 3/1954 | Slick et al. | |
| 2,696,259 A | 12/1954 | Greene | |
| 2,747,002 A | 5/1956 | Walker et al. | |
| 2,804,148 A | 8/1957 | Schremp et al. | |
| 2,872,935 A | 2/1959 | Kenney | |
| 2,993,540 A * | 7/1961 | Fons | E21B 33/134 |
| | | | 166/207 |
| 3,055,424 A | 9/1962 | Allen | |
| 3,302,717 A | 2/1967 | West et al. | |
| 3,354,955 A | 11/1967 | Beny | |
| 3,419,080 A | 12/1968 | Lebourg | |
| 3,525,398 A | 8/1970 | Fisher | |
| 3,633,377 A | 1/1972 | Quick | |
| 3,762,476 A | 10/1973 | Gall | |
| 3,957,641 A | 5/1976 | Jakubek et al. | |
| 3,968,568 A * | 7/1976 | Jackson | F16L 55/28 |
| | | | 33/777 |
| 4,074,763 A | 2/1978 | Stevens | |
| 4,106,562 A | 8/1978 | Barnes | |
| 4,107,052 A | 8/1978 | Yoshino et al. | |
| 4,163,770 A | 8/1979 | Porosoff | |
| 4,346,922 A | 8/1982 | Ohtsuga et al. | |
| 4,349,047 A | 9/1982 | Ditto | |
| 4,457,236 A * | 7/1984 | Akhmadiev | F16L 55/18 |
| | | | 104/138.2 |
| 4,462,714 A | 7/1984 | Smith et al. | |
| 4,572,295 A | 2/1986 | Walley | |
| 4,766,957 A | 8/1988 | McIntyre | |
| 4,817,721 A | 4/1989 | Pober | |
| 4,949,682 A | 8/1990 | Klein | |
| 5,154,588 A | 10/1992 | Freet et al. | |
| 5,149,344 A | 11/1992 | Macy | |
| 5,161,615 A | 11/1992 | Hutchins et al. | |
| 5,741,293 A | 4/1998 | Wijay | |
| 5,797,993 A * | 8/1998 | Woehleke | B08B 9/0557 |
| | | | 134/22.12 |
| 5,833,001 A | 11/1998 | Song et al. | |
| 6,063,295 A | 5/2000 | Williams | |
| 6,102,120 A | 8/2000 | Chen | |
| 6,253,850 B1 | 7/2001 | Nazzai et al. | |
| 6,336,504 B1 | 1/2002 | Alhanati et al. | |
| 6,368,498 B1 | 4/2002 | Guilmette | |
| 6,419,730 B1 | 7/2002 | Chavez | |
| 6,452,068 B1 | 9/2002 | Zuo et al. | |
| 6,497,287 B1 | 12/2002 | Podio et al. | |
| 6,533,039 B2 | 3/2003 | Rivas et al. | |
| 6,540,777 B2 | 4/2003 | Stenzel | |
| 6,672,385 B2 | 1/2004 | Kilaas et al. | |
| 6,719,048 B1 | 4/2004 | Ramos et al. | |
| 6,752,175 B1 * | 6/2004 | Willschuetz | F16L 55/16455 |
| | | | 138/90 |
| 6,755,250 B2 | 6/2004 | Hall et al. | |
| 6,834,725 B2 | 12/2004 | Whanger et al. | |
| 6,860,329 B1 | 3/2005 | Oosterling | |
| 6,923,275 B2 | 8/2005 | Gardes | |
| 7,296,597 B1 | 11/2007 | Freyer et al. | |
| 7,311,818 B1 | 12/2007 | Gurfinkel | |
| 7,357,189 B2 | 4/2008 | Aldaz et al. | |
| 7,370,701 B2 | 5/2008 | Surjaatmadja et al. | |
| 7,380,595 B2 | 6/2008 | Wetzel et al. | |
| 7,611,635 B2 | 11/2009 | Chieng et al. | |
| 7,665,537 B2 | 2/2010 | Patel et al. | |
| 7,708,081 B2 | 5/2010 | Bosma et al. | |
| 7,927,161 B2 | 4/2011 | Schaefer, Jr. | |
| 7,954,516 B2 | 6/2011 | Hallundbaek | |
| 8,002,121 B2 | 8/2011 | Berard et al. | |
| 8,414,781 B2 | 4/2013 | Berard et al. | |
| 8,523,936 B2 | 9/2013 | Schmid et al. | |
| 8,528,632 B2 | 9/2013 | Mack | |
| 8,651,177 B2 | 2/2014 | Vail et al. | |
| 9,095,799 B1 | 8/2015 | Packard | |
| 10,087,708 B2 | 10/2018 | Al-Gouhi | |
| 10,385,635 B1 | 8/2019 | Tucker | |
| 10,605,041 B2 * | 3/2020 | Noui-Mehidi | E21B 33/124 |
| 10,605,397 B2 * | 3/2020 | Acker | F16L 55/1612 |
| 2003/0121558 A1 | 7/2003 | Cook et al. | |
| 2004/0144535 A1 | 7/2004 | Kalman et al. | |
| 2005/0199401 A1 | 9/2005 | Patel | |
| 2007/0137826 A1 | 6/2007 | Bosma | |
| 2007/0260439 A1 | 7/2007 | Jeffryes et al. | |
| 2007/0284011 A1 * | 12/2007 | Freyer | F16L 55/1612 |
| | | | 138/90 |
| 2008/0060813 A1 | 3/2008 | Badalamenti et al. | |
| 2008/0093083 A1 | 4/2008 | Johnson | |
| 2008/0245525 A1 | 10/2008 | Rivas et al. | |
| 2009/0178809 A1 | 7/2009 | Keller | |
| 2009/0183875 A1 | 7/2009 | Rayssiguier et al. | |
| 2009/0223662 A1 | 9/2009 | Shaw et al. | |
| 2010/0096141 A1 | 4/2010 | Brown et al. | |
| 2010/0258306 A1 | 10/2010 | Camilleri et al. | |
| 2010/0284828 A1 | 11/2010 | Woie et al. | |
| 2011/0266228 A1 | 11/2011 | Brown et al. | |
| 2012/0055667 A1 | 3/2012 | Ingram | |
| 2012/0273078 A1 | 11/2012 | Hawwa et al. | |
| 2013/0134109 A1 | 5/2013 | Tweit | |
| 2013/0153207 A1 | 6/2013 | Lauderdale | |
| 2013/0228075 A1 | 7/2013 | Zylla | |
| 2013/0220641 A1 | 8/2013 | Fripp et al. | |
| 2013/0233414 A1 | 9/2013 | Valencia | |
| 2014/0158350 A1 * | 6/2014 | Castillo | E21B 23/10 |
| | | | 166/250.17 |
| 2014/0299331 A1 | 10/2014 | Hart et al. | |
| 2015/0090122 A1 | 4/2015 | Hemstock | |
| 2015/0144541 A1 | 5/2015 | Balasubramanian | |
| 2015/0267501 A1 | 9/2015 | Al-Gouhi | |
| 2016/0045842 A1 | 2/2016 | Agar et al. | |
| 2016/0084059 A1 | 3/2016 | Moore et al. | |
| 2016/0177659 A1 | 6/2016 | Voll | |
| 2018/0112490 A1 | 4/2018 | Al-Gouhi et al. | |
| 2018/0154318 A1 | 6/2018 | Al-Gouhi | |
| 2019/0060795 A1 | 2/2019 | Bulekbay | |

FOREIGN PATENT DOCUMENTS

| | | |
|---|---|---|
| GB | 2251011 | 6/1992 |
| GB | 2411918 | 9/2005 |
| RU | 138787 | 3/2014 |
| RU | 2632607 | 10/2017 |
| WO | 1999015755 | 4/1999 |
| WO | 2002099247 | 12/2002 |
| WO | 2010127240 | 11/2010 |
| WO | WO 2014093649 | 6/2014 |
| WO | 2018057361 | 3/2018 |
| WO | 2018098303 | 5/2018 |

OTHER PUBLICATIONS

"Solids Interceptors," Zurn Product Chart, available on or before Jun. 14, 2017, 9 pages.

ceramicindustry.com [online], "Microwave Heating of Ceramics," Oct. 1, 2015, [retrieved on May 15, 2018], retrieved from URL: <https://www.ceramicindustry.com/articles/95044-microwave-heating-of-ceramics>, 4 pages.

energyweldfab.com [online], "Sandtraps," Energy weldfab, Manufacturer of Oil and Gas Processing Equipment, available on or before Jun. 25, 2016, retrieved on Oct. 11, 2018, retrieved from URL: <https://www.energyweldfab.com/sandtraps/>, 3 pages.

Gur et al., "Radially Expandable Ring-Linke Structure with Antiparallelogram Loops," Proceedings of the International Symposium of Mechanism and Machine Science, AzC IFToMM—Azerbaijan Tech-

(56) References Cited

OTHER PUBLICATIONS nical University, Baku, Azerbaijan, Sep. 11-14, 2017, 6 pages.
Innopipe, "Innopipe-Unique inline gas separator and piggable drip system removes 99% of liquids," Innopipe Inline Separators and Drips, Copyright 2017, 3 pages.
Rooks et al., "Integral Pod Intake for Electrical Submersible Pumps," SPE 160864, presented at the SPE Saudi Arabia Section Technical Symposium and Exhibition in Al-Khobar, Saudi Arabia, Apr. 8-11, 2012, 8 pages.
Saltel et al., "In-Situ Polymerisation of an Inflatable Composite Sleeve to Reline Damaged Tubing and Shut-Off Perforation," SPE 8202, presented at the Offshore Technology Conference, May 6-9, 1996, 9 pages.
Shell Global Solutions, "Pure and Simple—Innovative Water Separation Technology Cuts Costs in Oman," Published in 2004, 2 pages.
Technip, "Electricity Trace Heated Pipe-in-Pipe," Engineering and Technologies, Jan. 2016, 6 pages.

\* cited by examiner

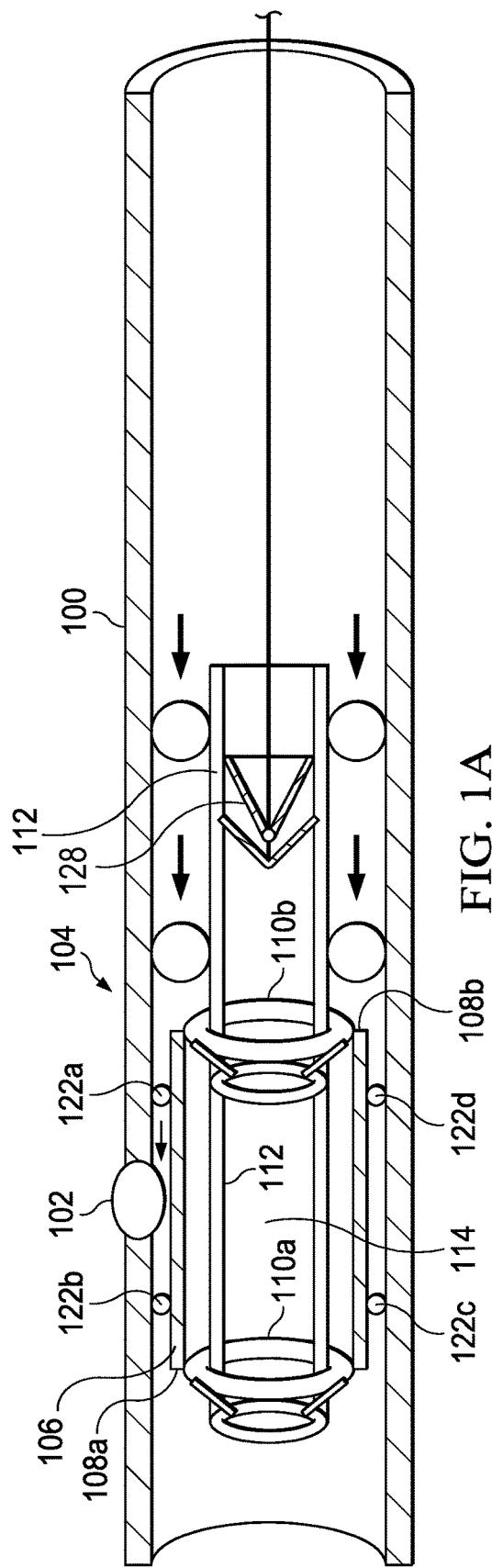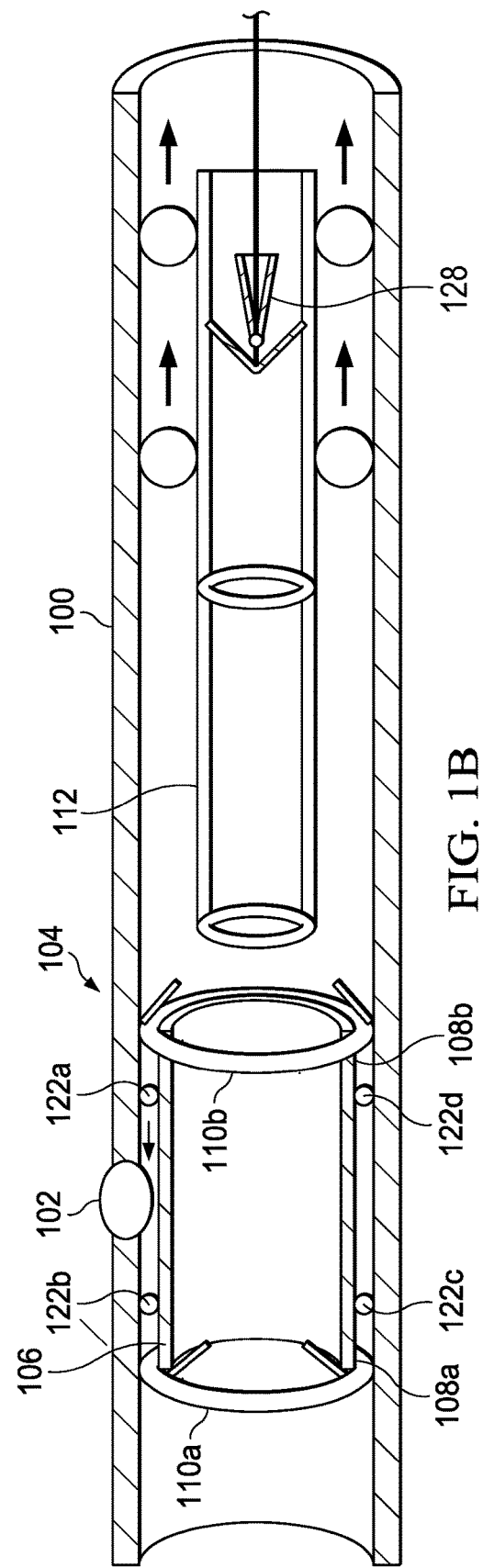
FIG. 1A
FIG. 1B

AUTOMATED FLOWLINE LEAK SEALING SYSTEM AND METHOD

TECHNICAL FIELD

This disclosure relates to fluid flow through flowlines, for example, pipelines flowing hydrocarbons such as petroleum, natural gas, or combinations of them. Also, this disclosure relates to sealing leaks in flowlines through which fluid is flowed.

BACKGROUND

Flowlines are used to flow fluid between two locations. For example, hydrocarbons such as petroleum, natural gas, or combinations of them, which are produced at a wellsite are flowed through flowlines to processing plants, for example, gas-oil separation plants. Sometimes, flowlines leak, due to, for example, mechanical wear and tear, the corrosive nature of the fluid flow through the flowlines, or other reasons. Repairing the leaks can require stopping fluid flow through the flowlines.

SUMMARY

This disclosure describes technologies relating to systems and methods for sealing leaks in flowlines.

Certain aspects of the subject matter described in this disclosure can be implemented as a flowline sealing tool assembly. The assembly includes a hollow sealing sleeve, a pair of sealing elements, and a deployment tool. The hollow sealing sleeve is configured to be positioned within a flowline with a circumferential leak. The sealing sleeve includes a pair of ends configured to be positioned on either side of the circumferential leak within the flowline. The pair of sealing elements are attached to the pair of ends, respectively. The pair of sealing elements are configured to seal the pair of ends to an inner wall of the flowline on either side of the circumferential leak. The deployment tool includes a hollow cylinder configured to be inserted into and retracted from an inner volume defined by the sealing sleeve. The deployment tool is configured to activate the pair of sealing elements to seal the pair of ends to the inner wall of the flowline on either side of the circumferential leak in response to being retracted from the inner volume defined by the sealing sleeve.

An aspect combinable with any other aspect includes the following features. The pair of sealing elements is in an undeployed state prior to and when the deployment tool is inserted into the inner volume defined by the sealing sleeve. In the undeployed state, the pair of sealing elements are configured to not seal the pair of ends to the inner wall of the flowline on either side of the circumferential leak.

An aspect combinable with any other aspect includes the following features. In the undeployed state, an outer diameter of the pair of sealing elements is less than an inner diameter of the flowline.

An aspect combinable with any other aspect includes the following features. The pair of sealing elements are configured to be transitioned from the undeployed state to a deployed state in which the pair of sealing elements expand radially to seal the pair of ends to the inner wall of the flowline on either side of the circumferential leak.

An aspect combinable with any other aspect includes the following features. The assembly includes a pair of activating arms attached to the pair of ends, respectively. Each activating arm faces in a first direction within the flowline when the pair of sealing elements is in the undeployed state. Each activating arm is configured to be shifted from the first direction to a second, opposite direction within the flowline. The pair of sealing elements are configured to be transitioned from the undeployed state to the deployed state in response to each activating arm shifting from the first direction to the second, opposite direction.

An aspect combinable with any other aspect includes the following features. The deployment tool is configured to shift each activating arm from the first direction to the second, opposite direction when retracted from the inner volume defined by the sealing sleeve.

An aspect combinable with any other aspect includes the following features. The deployment tool includes a pair of rings attached to the hollow cylinder and spaced apart by a distance equal to a distance between the pair of sealing elements. The pair of rings shift the pair of activating arms from the first direction to the second, opposite direction when the deployment tool is retracted from the inner volume defined by the sealing sleeve.

An aspect combinable with any other aspect includes the following features. The sealing sleeve includes a first set of rollers attached to an outer surface of the sealing sleeve. The first set of rollers are configured to move the sealing sleeve within the flowline responsive to fluid flow within the flowline to be positioned on either side of the circumferential leak within the flowline.

An aspect combinable with any other aspect includes the following features. The deployment tool includes a second set of rollers attached to an outer surface of the deployment tool. The second set of rollers are configured to move the deployment tool into and out of the inner volume defined by the sealing sleeve responsive to the fluid flow within the flowline.

An aspect combinable with any other aspect includes the following features. The assembly includes a slickline connected to an end of the deployment tool. The slickline is configured to be pulled to retract the deployment tool from the inner volume defined by the sealing sleeve.

An aspect combinable with any other aspect includes the following features. The deployment tool includes an umbrella tool positioned within the hollow cylinder. The umbrella tool is in an open position when the deployment tool is inserted within the inner volume defined by the sealing sleeve. The umbrella tool is configured to transition from the open position to the closed position in response to the slickline being pulled to retract the deployment tool from the inner volume defined by the sealing sleeve.

Certain aspects of the subject matter described here can be implemented as a method. A pair of ends of a hollow sealing sleeve are positioned on either side of a circumferential leak within a flowline. A pair of sealing elements are attached to the pair of ends. The pair of sealing elements is in an undeployed state. A deployment tool is positioned within an inner volume defined by the sealing sleeve. The deployment tool is configured to be retracted from the inner volume defined by the sealing sleeve. The deployment tool is retracted from the inner volume defined by the sealing sleeve. In response to the retracting, the deployment tool transitions the pair of sealing elements from the undeployed state to a deployed state to seal the pair of ends to the inner wall of the flowline on either side of the circumferential leak.

An aspect combinable with any other aspect includes the following features. The deployment tool is removed from the flowline after retracting the deployment tool from the inner volume defined by the sealing sleeve.

An aspect combinable with any other aspect includes the following features. Fluid flow through the flowline is temporarily stopped in response to identifying the circumferential leak. After removing the deployment tool from the flowline, fluid flow through the inner volume defined by the sealing sleeve is re-started.

An aspect combinable with any other aspect includes the following features. To transition the pair of sealing elements from the undeployed state to the deployed state, the pair of sealing elements are expanded radially.

An aspect combinable with any other aspect includes the following features. A pair of activating arms are attached to the pair of ends, respectively. Each activating arm faces in a first direction within the flowline when the pair of sealing elements is in the undeployed state. Each activating arm is configured to be shifted from the first direction to a second, opposite direction within the flowline. To transition the pair of sealing elements from the undeployed state to the deployed state, each activating arm is shifted from the first direction to the second, opposite direction.

An aspect combinable with any other aspect includes the following features. The deployment ring includes a pair of rings attached to the hollow cylinder and spaced apart by a distance equal to a distance between the pair of sealing elements. To shift each activating arm, the pair of rings moves the pair of activating arms from the first direction to the second, opposite direction when the deployment tool is retracted from the inner volume defined by the sealing sleeve.

An aspect combinable with any other aspect includes the following features. The sealing sleeve includes a first set of rollers attached to an outer surface of the sealing sleeve. To position the pair of ends of the hollow sealing sleeve on either side of the circumferential leak, the sealing sleeve is moved within the flowline responsive to fluid flow within the flowline to be positioned on either side of the circumferential leak.

An aspect combinable with any other aspect includes the following features. The deployment tool includes a second set of rollers attached to an outer surface of the deployment tool. To retract the deployment tool from the inner volume defined by the sealing sleeve, the second set of rollers move the deployment tool out of the inner volume, responsive to the fluid flow within the flowline.

An aspect combinable with any other aspect includes the following features. A slickline is connected to an end of the deployment tool. To retract the deployment tool from the inner volume defined by the sealing sleeve, the slickline is pulled.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are schematic diagrams of a flowline sealing tool assembly in undeployed and deployed states, respectively.

Like reference numbers and designations in the various drawings indicate like elements.

DETAILED DESCRIPTION

Figure 2A:
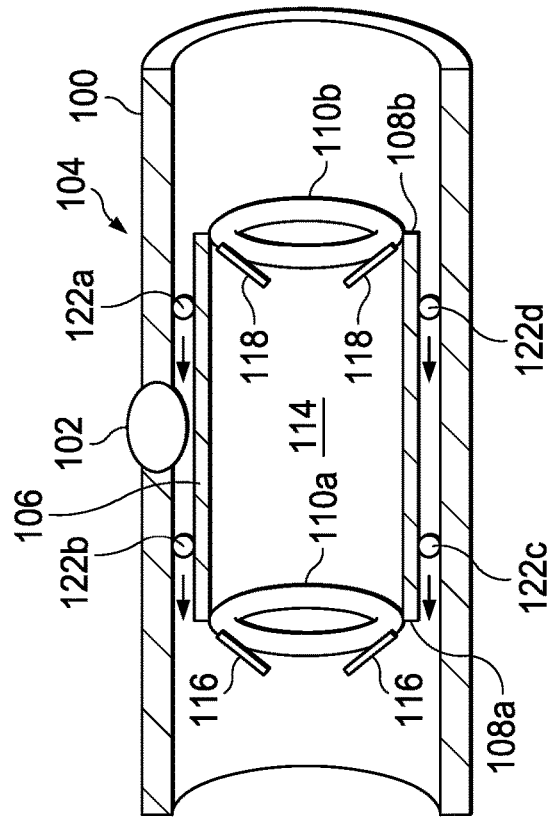
FIGS. 2A and 2B are schematic diagrams of a sealing sleeve in undeployed and deployed states, respectively.

This disclosure describes techniques directed to temporarily sealing a flowline leak in a manner that allows fluid to flow through the flowline without being lost through the flowline leak. To do so, a sliding sealing sleeve (for example, a cylindrical carbon-fiber reinforced polymer sleeve) with sealing elements (for example, packers) at either end is used. Prior to deployment, the sealing elements are in a de-activated (or undeployed) state in which the outer diameter of the sealing elements is less than the inner diameter of the flowline. Each sealing element is coupled to a pair of activating arms (for example, packer arms). In the undeployed state, the arms face in one direction (for example, towards fluid flow). To activate the sealing elements, the arms are pivoted to face in the opposite direction (for example, opposite to fluid flow). Within the sealing sleeve is a launching tool (also called a deployment tool) that includes an umbrella tool in an open position. The sealing sleeve is connected to a slickline that is unspooled to allow the sealing sleeve to travel within the flowline to the flowline leak location. The end of the slickline is attached to the deployment tool. Rollers on the sealing sleeve allow the sleeve to travel within the flowline.

In operation, a leak is detected in the flowline, for example, using a fiber optic sensor. The sealing sleeve with the deployment tool is deployed by unspooling the slickline until the sleeve reaches the leak location and the ends of the sleeve are on either side of the leak. The slickline is then reversed to pull the deployment tool out of the sleeve. Doing so collapses the umbrella tool. As the deployment tool is pulled out of the sleeve, rings on the deployment tool causes the activating arms of the sealing elements to pivot. The pivoting action deploys, that is, radially expands, the sealing elements, thereby sealing on either side of the leak. The deployment tool is then retrieved, and fluid flow is restarted. The fluid flows through the sealing sleeve and avoids the leak. When the flowline joint is repaired, the sealing sleeve can be retrieved.

Implementing the flowline sealing tool assembly described in this disclosure can provide an automated safety enhancement to a leaking flowline, for example, a leaking gas flowline. The deployed assembly can temporarily and quickly fix leaks in flowlines without necessitating major disruptions to fluid transportation through the flowlines.

FIGS. 1A and 1B are schematic diagrams of a flowline sealing tool assembly in undeployed and deployed states, respectively. The flowline 100 is an elongated tubular pipe through which fluids, for example, liquids, gases or combinations of them flow. For example, the flowline 100 is a hydrocarbon flowline through which natural gas is flowed. The flowline 100 includes a wall that defines a circumference of the flowline 100. In some implementations, the flowline 100 can have a circular inner cross-section. Alternatively, the flowline 100 can have non-circular inner cross-sections. An inner diameter of the flowline 100 is sufficiently large for the flowline sealing tool assembly to be positioned and maneuvered within the inner volume.

In the context of this disclosure, the flowline leak 102 is a circumferential leak in the wall of the flowline 100. Unless sealed, the fluid flowed through the flowline 100 can escape through the flowline leak 102. Although FIG. 1A schematically shows the flowline leak 102 at a single location on the flowline 100, the leak can be distributed across multiple axial locations on the wall of the flowline 100. The flowline sealing tool assembly described here can be used to temporarily seal the flowline leak 102, either at the single location or at the multiple axial locations. In some instances, more than one flowline sealing tool assembly can be implemented, each to seal a corresponding flowline leak 102.

As described in detail later, in response to detecting the flowline leak 102, a flowline sealing tool assembly 104 is deployed within the flowline 100 to temporarily seal the flowline leak 102. Temporarily sealing the flowline leak 102 means that the flowline sealing tool assembly 104 is not a permanent solution to fix the flowline leak 102. Rather, the flowline sealing tool assembly 104 not only seals the flowline leak 102, but also permits continuing flow through the flowline 100 and through the flowline sealing tool assembly 104 while a permanent solution to the flowline leak 102 is identified. In some instances, the permanent solution can include removal and replacement of the section of the flowline 100 that has the flowline leak 102. In such instances, the flowline sealing tool assembly 104 can be retrieved during such removal and replacement.

The flowine sealing tool assembly 104 includes a hollow sealing sleeve 106 that can be positioned within the flowline 100. The sealing sleeve 106 is an elongated, tubular member, which can be made, for example, of carbon-fiber reinforced polymer. In general, the sealing sleeve 106 can be made of any material that is capable of withstanding fluid flow conditions through the flowline 100 (for example, pressure, temperature, and similar flow conditions) and also withstanding the fluid itself, for example, corrosive nature of the fluid.

The outer cross-section of the sealing sleeve 106 can have the same shape as the inner cross-section of the flowline 100. For example, the sealing sleeve 106 can have a circular outer cross-section when the flowline 100 has a circular inner cross-section.

The sealing sleeve 106 includes a pair of ends, namely, a first end 108a and a second end 108b. When the flowline sealing tube assembly 104 is deployed within the flowline 100, the pair of ends of the sealing sleeve 106 are positioned on either side of the flowline leak 102. As described later, such positioning allows to isolate the circumferential leak from a remainder of the flowline 100. Fluid flow is then routed through the sealing sleeve 106 while avoiding the section of the flowline 100 with the flowline leak 102.

A pair of sealing elements, namely, a first sealing element 110a and a second sealing element 110b, are attached to the pair of ends, respectively. The pair of sealing elements can seal the pair of ends to an inner wall of the flowline 100 on either side of the flowline leak 102. In some implementations, each sealing element is a mechanical packer that includes an expandable metallic structure surrounded by elastomeric elements, for example, rubber elements. Each sealing element can be transitioned from an undeployed state of the sealing element to a deployed state of the sealing element. In the undeployed state of the sealing element, the sealing element has a diameter which is smaller than a diameter of the sealing element in the deployed state. For example, deploying the sealing elements causes the metallic structure to expand from the smaller diameter to the larger diameter. Upon expansion, the elastomeric elements contact and seal against the inner wall of the flowline 100.

A deployment tool 112 is inserted into and retracted from an inner volume 114 defined by the sealing sleeve 106. The deployment tool 112 includes a hollow cylinder having an outer diameter smaller than an inner diameter of the sealing sleeve 106. The deployment tool 112 can have the same properties as, and can be made using, the same material as the sealing sleeve 106. An outer cross-sectional shape of the deployment tool 112 matches an inner cross-sectional shape of the sealing sleeve 106. FIG. 1A shows the flowline sealing tool assembly 104 positioned with the pair of ends of the sealing sleeve 106 on either side of the flowline leak 102. Prior to deployment into the flowline, that is, in an undeployed state, the deployment tool 112 can be inserted into and reside within the inner volume 114 of the sealing sleeve 106. FIG. 1B shows the flowline sealing tool assembly 104 with the deployment tool 112 retracted from within the sealing sleeve 106. In response to being retracted from the inner volume 114, the deployment tool 112 can activate the pair of sealing elements to seal the pair of ends to the inner wall of the flowline 100. The deployment tool 112 can then be removed from within the flowline 100, and the fluid flow through the flowline 100 can be resumed. The fluid flows through the hollow sealing sleeve 106, thereby avoiding the flowline leak 102.

Figure 2B:
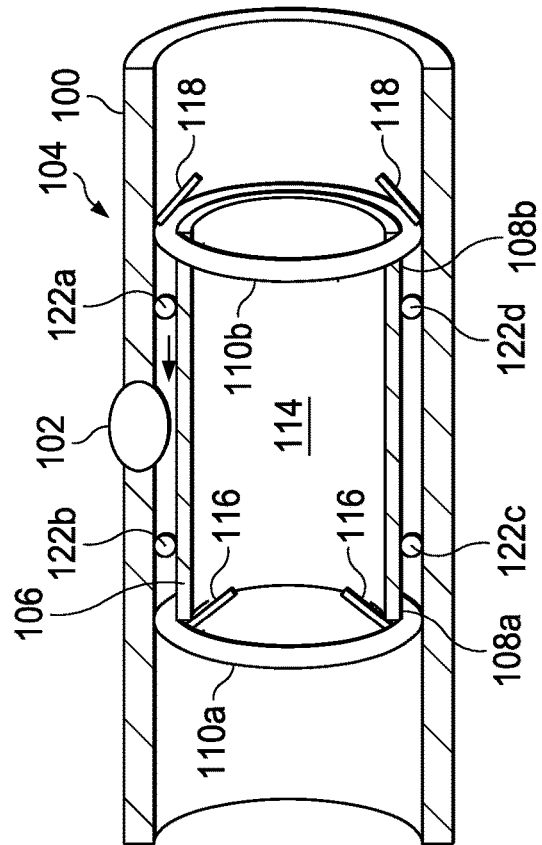

FIGS. 2A and 2B are schematic diagrams of a sealing sleeve in undeployed and deployed states, respectively. In particular, FIG. 2A shows the pair of sealing elements 110a and 110b in the undeployed state prior to and when the deployment tool 112 is inserted into the inner volume 114 defined by the sealing sleeve 106. In the undeployed state, the pair of sealing elements do not seal the pair of ends 108a and 108b to the inner wall of the flowline 100 on either side of the flowline leak 102. In the undeployed state, an outer diameter of the pair of the sealing elements 110a and 110b is less than an inner diameter of the flowline 100. Such an arrangement allows the sealing sleeve 106 with the pair of sealing elements to be pushed through the flowline 100 and positioned adjacent the flowline leak 102 as described earlier. In some implementations, multiple rollers, for example, rollers 122a, 122b, 122c, 122d (FIGS. 1A, 1B) can be attached to an outer surface of the sealing sleeve 106. Each roller can be of a size that allows the roller to fit within an annular gap between an outer surface of the sealing sleeve 106 and the inner wall of the flowline 100. The multiple rollers allow pushing the sealing sleeve 106 through the flowline 100 to the desired location. In some implementations, the sealing sleeve 106 is pushed by fluid flow that applies a force to an umbrella tool (described later).

FIG. 2B shows the pair of sealing elements 110a and 110b in the deployed state. The pair of sealing elements 110a and 110b can be transitioned from the undeployed state to the deployed state in which the pair of sealing elements 110a and 110b expand radially to seal the pair of ends 108a and 108b to the inner wall of the flowline 100 on either side of the flowline leak 102. As shown in each of FIGS. 1A, 1B, 2A, and 2B, the flowline sealing tool assembly 104 includes a pair of activating arms attached to the pair of ends, respectively. For example, a pair of activating arms 116 is attached to the first end 108a and a pair of activating arms 118 is attached to the second end 108b. In particular, each activating arm has a first end and a second end. Each first end of each activating arm is connected to (for example, connected directly to or affixed to the respective sealing element at a respective end of the sealing sleeve 106. Each activating arm extends away from its respective first end and terminates at its respective second end. In this configuration, the second ends of the pair of activating arms 116 are positioned outside the inner volume 114 defined by the sealing sleeve 106, and the second ends of the pair of activating arms 118 are positioned inside the inner volume 114 defined by the sealing sleeve 106.

As shown in FIGS. 1A and 2A, when the pair of sealing elements 110*a* and 110*b* is in the undeployed state, each activating arm faces in a first direction, for example, the direction of fluid flow through the flowline 100. Each activating arm can be shifted from the first direction to a second, opposite direction (for example, opposite the direction of fluid flow through the flowline 100). When each activating arm is shifted from the first direction to the second direction, each activating arm pivots about the first end connected to the sealing element.

Upon shifting, the second ends of the pair of activating arms 116 are positioned inside the inner volume 114, and the second ends of the pair of activating arms 118 are positioned outside the inner volume 114.

The pivoting action of the pair of activating arms activates, that is, deploys, the respective sealing element to which the pair of activating arms are connected. The pair of sealing elements 110*a* and 110*b* can transition from the undeployed state to the deployed state in response to each activating arm shifting from the first direction to the second, opposite direction. As shown in FIGS. 1B and 2B, each activating arm has transitioned from the first direction to the second, opposite direction, and the pair of sealing elements 110*a* and 110*b* have transitioned from the undeployed state to the deployed state. As described earlier, in the deployed state, the pair of sealing elements 110*a* and 110*b* have radially expanded and sealed against the inner wall of the flowline 100 on either side of the flowline leak 102.

Figure 3A:
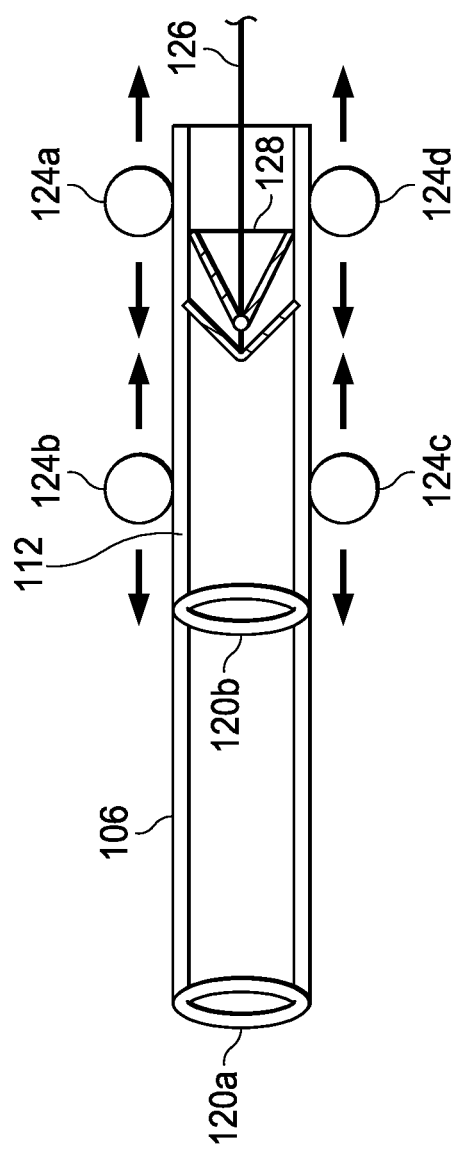
FIGS. 3A and 3B are schematic diagrams of a deployment tool prior to and after deployment, respectively, of the sealing sleeve.
Figure 3B:
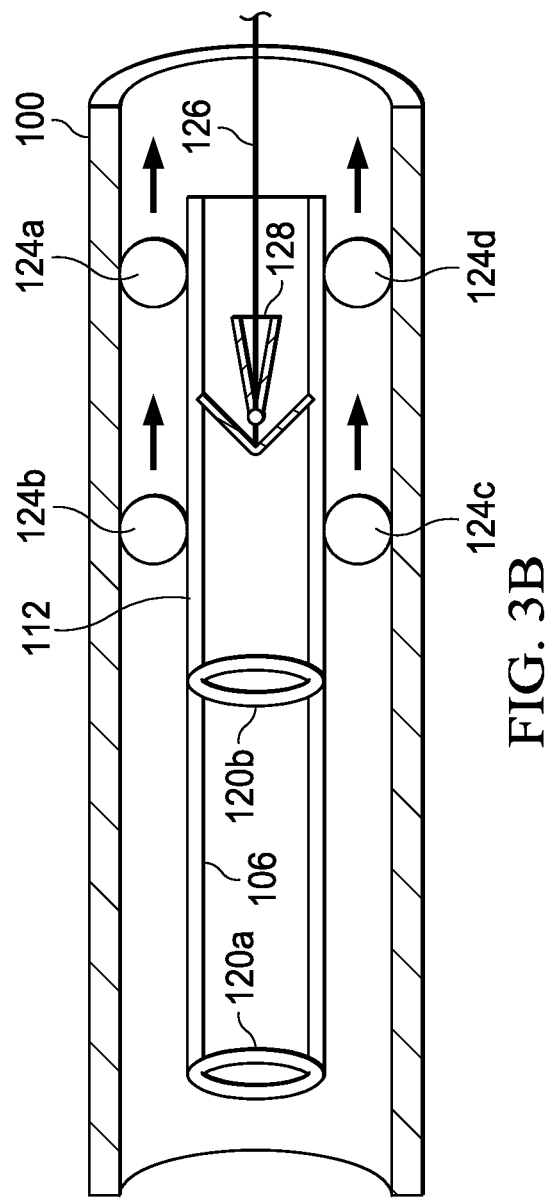

FIGS. 3A and 3B are schematic diagrams of a deployment tool prior to and after deployment, respectively, of the sealing sleeve. In particular, FIG. 3A shows the deployment tool 112 as it would appear when inserted into the inner volume 114 defined by the sealing sleeve 106. FIGS. 1A, 1B, 3A, and 3B each show that the deployment tool 112 includes a pair of rings, namely, a first ring 120*a* and a second ring 120*b* attached to the hollow cylinder of the deployment tool 112. For example, the first ring 120*a* is attached to an end of the deployment tool 112. The second ring 120*b* is spaced apart from the first ring 120*a*, by a distance equal to a distance between the pair of sealing elements 110*a* and 110*b*. As described earlier, in the undeployed state of the pair of sealing elements 110*a* and 110*b* (FIGS. 1A, 3A), the second ends of the pair of activating arms 116 are positioned outside the inner volume 114. Also, the first ring 120*a* is positioned outside the inner volume 114 ahead of the second ends of the pair of activating arms 116. Similarly, in the undeployed state of the pair of sealing elements 110*a* and 110*b*, the second ends of the pair of activating arms 118 are positioned inside the inner volume 114. Also, the second ring 120*b* is positioned inside the inner volume 114 ahead of the second ends of the pair of activating arms 118.

As described earlier, the pair of sealing elements 110*a* and 110*b* are deployed by retracting the deployment tool 112 from within the inner volume 114 in the second direction. In some implementations, multiple rollers, for example, rollers 124*a*, 124*b*, 124*c*, 124*d* (FIGS. 1A, 1B) can be attached to an outer surface of the deployment tool 112. Each roller can be of a size that allows the roller to fit within an annular gap between an outer surface of the deployment tool 112 and the inner wall of the flowline 100. The multiple rollers allow retracting the deployment tool 112 from within the sealing sleeve 106. During the retraction, the first ring 120*a* contacts and applies a force on the second ends of the pair of the activating arms 116 in the second direction. Simultaneously, the second ring 120*b* contacts and applies a force on the second ends of the pair of the activating arms 118 in the second direction. The forces on the second ends of each pair of the activating arms shifts and pivots the activating arms and transitions the pair of sealing elements from the undeployed state to the deployed state, as described earlier.

In some implementations, only one ring can be implemented instead of two as described earlier. In such implementations, the same ring can activate the first pair of arms and the second pair of arms in sequence.

In some implementations, the deployment tool 112 is connected to a slickline 126 or similar wire or cable. The slickline 126 can be pulled to retract the deployment tool 112 from the inner volume 106. In some implementations, the deployment tool 112 includes an umbrella tool 128 positioned within the deployment tool 112. The umbrella tool 128 can have the shape and structure of an umbrella. For example, the umbrella tool 128 can have a central rod member with an expandable and collapsible frame attached to the central rod member (for example, at an end of the central rod member). A material layer, for example, a fabric or polymer layer or a layer made of any material that can withstand fluid flow conditions and the fluid, covers the frame of the umbrella tool 128. The frame of the umbrella tool 128 can be in an expanded state when the umbrella tool 128 is in an open position and in a collapsed state when the umbrella tool 128 is in a closed position. Thus, an effective cross-sectional diameter of the umbrella tool 128 in the closed position is less than the effective cross-sectional diameter of the umbrella tool 128 in the open position. Also, in the open position, the material layer is stretched over the frame providing a drag force to the umbrella tool 128 caused by the fluid flowing through the flowline 100. In contrast, in the closed position, the material layer is not stretched over the frame, and the drag force is significantly reduced or is absent.

Prior to deploying the sealing elements 110*a* and 110*b*, the umbrella tool 128 is in an open position, a portion of the deployment tool 112 resides within the inner volume 114 and the pair of activating arms are facing the first direction (FIGS. 1A, 3A). Fluid flowing through the flowline 100 applies a drag force on the material layer of the umbrella tool 128, causing the flowline sealing tool assembly 104 to move towards the flowline leak 102. The umbrella tool 128 is also connected to the slickline 126, which can be unspooled to a length sufficient to place the sealing sleeve 106 adjacent the flowline leak 102, as described earlier. The slickline 126 is then pulled in the second direction (that is, opposite to the fluid flow) causing the umbrella tool 128 to transition from the open position to the closed position (FIGS. 1B, 3B). In the closed position, the frame of the umbrella tool 128 collapses and the drag force on the material layer decreases compared to the drag force when the umbrella tool 128 is in the open position. The slickline 126 retracts the deployment tool 112 from the inner volume 114. During the retraction, the pair of rings 120*a* and 120*b* shift the pair of activating arms from the first direction to the second direction, thereby activating the pair of sealing elements 110*a* and 110*b*. The pair of sealing elements 110*a* and 110*b* isolate the flowline leak 102 from a remainder of the flowline 100. The deployment tool 112 is then removed from the flowline 100, and fluid flow is resumed through the flowline 100. As described earlier, the fluid flows through the sealing sleeve 106, thereby avoiding contact with the flowline leak 102.

Figure 4:
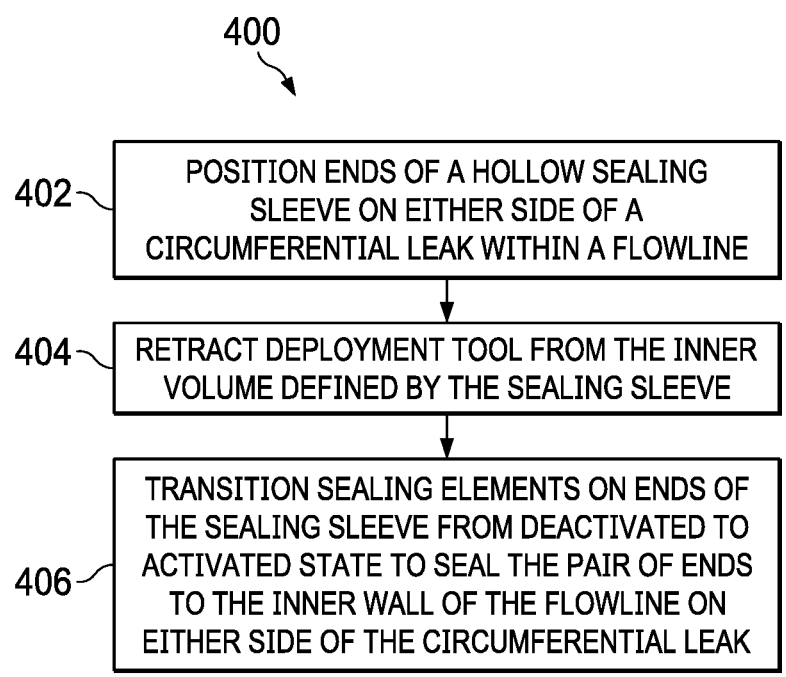
FIG. 4 is a flowchart of an example of a process of deploying the flowline sealing assembly.

FIG. 4 is a flowchart of an example of a process 400 of deploying the flowline sealing assembly. Certain process steps of the process 400 can be implemented by one or more components of the flowline sealing tool assembly 104 described earlier. Certain process steps of the process 400 can be implemented by an operator of the flowline sealing tool assembly 104. At 402, a pair of ends of a hollow sealing sleeve (for example, the sealing sleeve 106) are positioned on either side of a circumferential leak within a flowline (for example, the flowline leak 102 within the flowline 100). A pair of sealing elements (for example, sealing elements 110*a* and 110*b*) are attached to the pair of ends. The pair of sealing elements is in an undeployed state. The deployment tool (for example, the deployment tool 112) is positioned within an inner volume (for example, the inner volume 114) defined by the sealing sleeve. The deployment tool can be retracted from the inner volume defined by the sealing sleeve. At 404, the deployment tool is retracted from the inner volume defined by the sealing sleeve. At 406, the deployment tool transitions the pair of sealing elements from the undeployed state to a deployed state in response to the retraction. In the deployed state, the pair of sealing elements seal the pair of ends to the inner wall of the flowline on either side of the circumferential leak.

In some implementations, the deployment tool is removed from the flowline after retracting the deployment tool from the inner volume defined by the sealing sleeve. Subsequently, fluid flow through the flowline is assumed.

In some implementations, prior to deploying the flowline sealing tool assembly 104, fluid leak through the circumferential leak is identified, for example, using fiber-optic detection techniques. In response to identifying the fluid leak, fluid flow through the flowline is temporarily stopped, and the flowline sealing tool assembly 104 is deployed.

Figure 5:
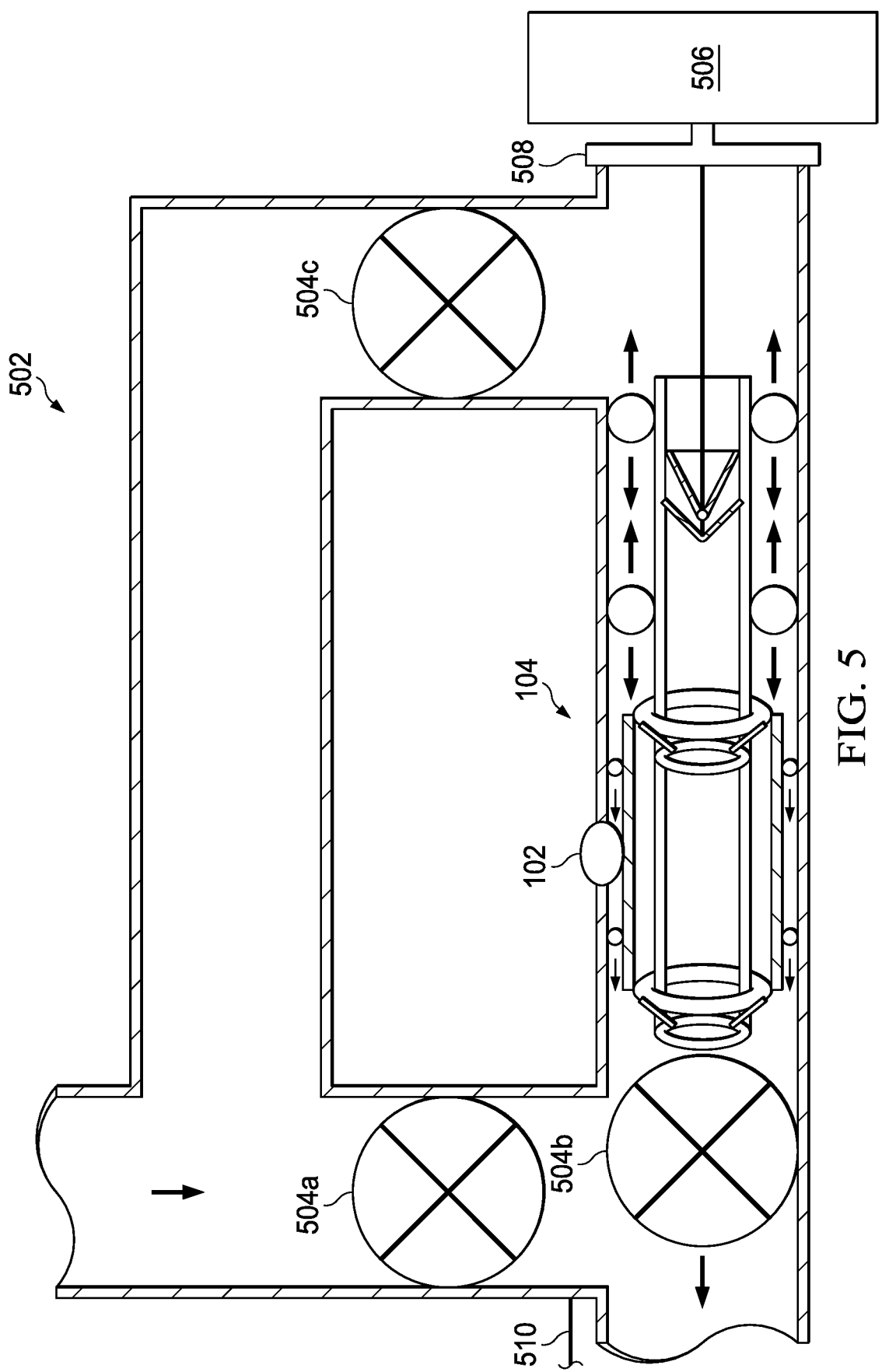
FIG. 5 is a schematic diagram of a sealing sleeve launcher to deploy the flowline sealing tool assembly into a flowline.

FIG. 5 is a schematic diagram of a flowline into which the flowline sealing tool assembly is deployed. FIG. 5 is a schematic depiction of a sealing sleeve launcher 502 that can be coupled to a flowline to launch the flowline sealing tool assembly 104 into a portion of the flowline that has the circumferential leak (not shown in FIG. 5). The sealing sleeve launcher 502 includes multiple valves, for example, valves 504*a*, 504*b*, and 504*c*. The sealing sleeve launcher 502 includes a maintenance flange 508, which serves as a removable cover into which the flowline sealing tool assembly 104 can be positioned to deploy the flowline sealing tool assembly 104 to the location of the circumferential leak. A slickline spooling unit 506 is used to spool and unspool the slickline 126. As described later with reference to FIG. 6, in response to detecting the circumferential leak, for example, using a fiber optic detection system (not shown) that includes a fiber optic cable 510 connected to or coiled around the flowline, the valves are operated in a certain sequence to deploy the flowline sealing tool assembly 104 to the location of the circumferential leak and to further seal the circumferential leak, using the sealing sleeve 106 of the flowline sealing tool assembly 104.

Figure 6:
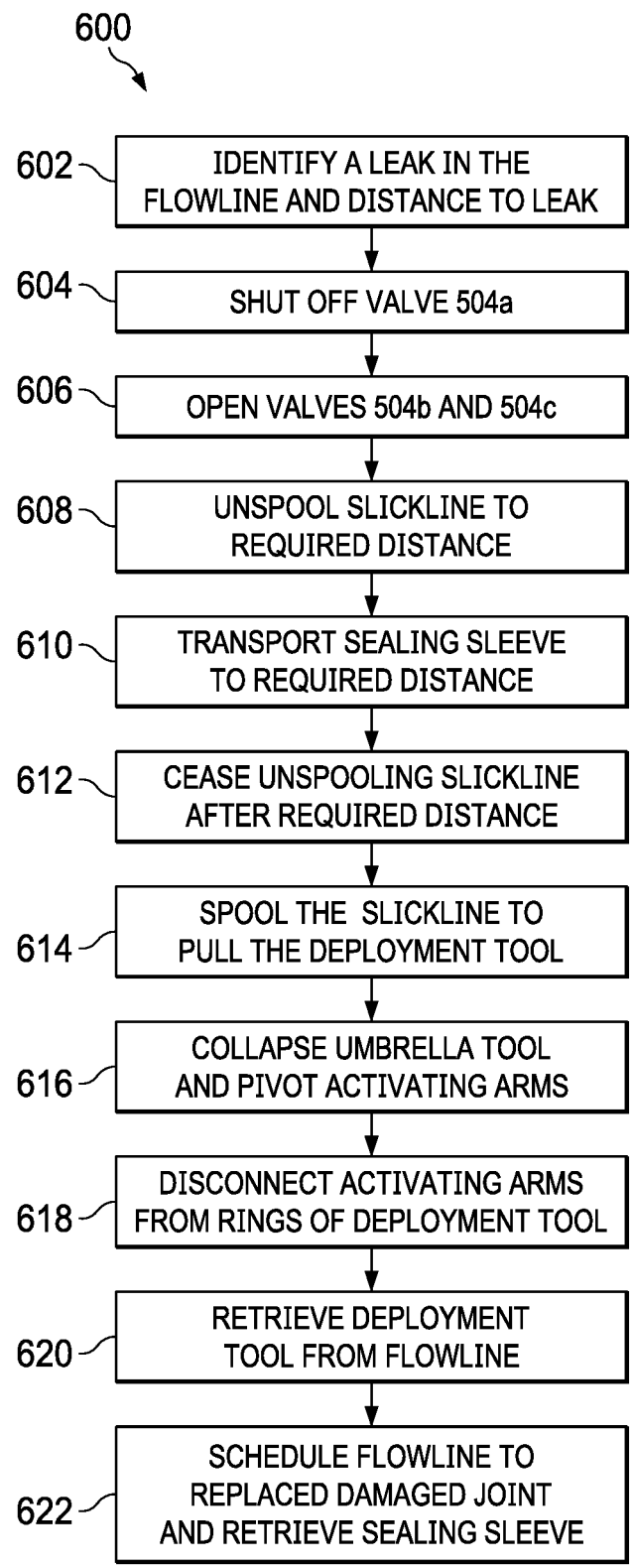
FIG. 6 is a flowchart of an example of a process of deploying the flowline sealing assembly using the sealing sleeve launcher.

FIG. 6 is a flowchart of an example of a process 600 of deploying the flowline sealing tool assembly into the flowline of FIG. 5. Certain process steps of the process 600 can be implemented by a controller (not shown) connected to the components of the sealing sleeve launcher 502. In some implementations, the controller can be a computer system that includes a computer-readable medium (for example, a non-transitory, computer-readable medium) storing computer instructions and one or more processors connected to the computer-readable medium that can execute the stored computer instructions to perform certain or all of the process steps of the process 600. The sealing sleeve launcher 502 is connected to the flowline to which the fluid flows. The flowline sealing tool assembly 104 is positioned between the valve 504C and the maintenance flange 508. During regular operation, the valve 504*a* is open and the valves 504*b* and 504*c* are closed. Consequently, fluid flows past the valve 504*a* and through the flowline.

At 602, the fiber optic detection system identifies a leak in the flowline as well as a distance between a location of the leak and the sealing sleeve launcher 502. At 604, the valve 504*a* is shut off, thereby temporarily stopping flow past the circumferential leak. At 606, the valves 504*b* and 504*c* are open. Because the valve 504*a* is shut off, fluid flows past the valve 504*b* and into a distal end of the flowline sealing tool assembly 104. The umbrella tool 128 is in an open position within the deployment tool 112. The fluid flowing past the flowline sealing tool assembly 104 applies a drag force on the umbrella tool 128 and pushes the flowline sealing tool assembly 104 past the open valve 504*b* into the flowline and towards the location of the circumferential leak. The controller of the sealing sleeve launcher 502 can operatively communicate with the controller of the fiber optic detection system to determine a distance that the flowline sealing tool assembly 104 needs to travel such that ends of the sealing sleeve 106 are positioned on either side of the circumferential leak. At 608, the slickline spooling unit 506 is unspooled to provide the required distance to the slickline 126 such that the flowline sealing tool assembly 104 can travel the determined distance. At 610, the sealing sleeve 106 reaches the determined distance, and, at 612, the slickline spooling unit 506 ceases to unspool the slickline 126. At 614, the slickline spooling unit 506 begins to spool the slickline 126, thereby pulling the deployment tool 112. At 616 and in response to the deployment tool 112 being pulled, the umbrella tool 128 collapses and the activating arms are pulled by the rings towards the opposite direction to activate the sealing elements to expand and seal against the inner wall of the flowline on either side of the circumferential leak. At 618 and at predetermined over pull, the activating arms disconnect from the rings. At 620, the deployment tool 112 is retrieved from within the flowline. At 622, the flowline is scheduled for replacing the damaged joint at the same time that the sealing sleeve is retrieved. To retrieve the sealing sleeve, the deployment tool is inserted into the inner volume defined by the sealing sleeve. The rings of the deployment tool shift the activating arms from the second direction to the first direction and cause the sealing elements to contract radially. The sealing sleeve can then be retrieved from within the damaged segment of the flowline. The position of the sealing sleeve within the flowline can also be modified in a similar manner. For example, if it is determined that the sealing sleeve needs to be moved from one location within the flowline to another location, the deployment tool can be inserted into the inner volume defined by the sealing sleeve to detach the sealing sleeve from its first location and to move the sealing sleeve to its second location.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A flowline sealing tool assembly comprising:
a hollow sealing sleeve configured to be positioned within a flowline with a circumferential leak, the sealing sleeve comprising a pair of ends configured to be positioned on either side of the circumferential leak within the flowline;
a pair of sealing elements attached to the pair of ends, respectively, the pair of sealing elements configured to seal the pair of ends to an inner wall of the flowline on either side of the circumferential leak; and
a deployment tool comprising a hollow cylinder configured to be inserted into and retracted from an inner volume defined by the sealing sleeve, the deployment tool configured to activate the pair of sealing elements to seal the pair of ends to the inner wall of the flowline on either side of the circumferential leak in response to the deployment tool being retracted from the inner volume defined by the sealing sleeve,
wherein the sealing sleeve comprises a first plurality of rollers attached to an outer surface of the sealing sleeve, the first plurality of rollers configured to guide movement of the sealing sleeve within the flowline responsive to fluid flow within the flowline, the plurality of rollers configured to be positioned on either side of the circumferential leak within the flowline.

2. The flowline sealing tool assembly of claim 1, wherein, in an undeployed state, the pair of sealing elements are configured to not seal the pair of ends to the inner wall of the flowline on either side of the circumferential leak.

3. The flowline sealing tool assembly of claim 2, wherein, in the undeployed state, an outer diameter of the pair of sealing elements is less than an inner diameter of the flowline.

4. The flowline sealing tool assembly of claim 3, wherein the pair of sealing elements are configured to be transitioned from the undeployed state to a deployed state in which the pair of sealing elements expand radially to seal the pair of ends to the inner wall of the flowline on either side of the circumferential leak.

5. The flowline sealing tool assembly of claim 4, further comprising a pair of activating arms attached to each end of the pair of ends, respectively, each activating arm facing in a first direction within the flowline when the pair of sealing elements is in the undeployed state, each activating arm configured to be shifted from the first direction to a second, opposite direction within the flowline, wherein the pair of sealing elements are configured to be transitioned from the undeployed state to the deployed state in response to each activating arm shifting from the first direction to the second, opposite direction.

6. The flowline sealing tool assembly of claim 5, wherein the deployment tool is configured to shift each activating arm from the first direction to the second, opposite direction when the deployment tool is retracted from the inner volume defined by the sealing sleeve.

7. The flowline sealing tool assembly of claim 6, wherein the deployment tool comprises a pair of rings attached to the hollow cylinder and spaced apart by a distance equal to a distance between the pair of sealing elements, wherein the pair of rings shift the pair of activating arms from the first direction to the second, opposite direction when the deployment tool is retracted from the inner volume defined by the sealing sleeve.

8. The flowline sealing tool assembly of claim 1, wherein the deployment tool comprises a second plurality of rollers attached to an outer surface of the deployment tool, the second plurality of rollers configured to guide movement of the deployment tool out of the inner volume defined by the sealing sleeve.

9. The flowline sealing tool assembly of claim 1, further comprising a slickline connected to an end of the deployment tool, the slickline configured to be pulled to retract the deployment tool from the inner volume defined by the sealing sleeve.

10. The flowline sealing tool assembly of claim 9, wherein the deployment tool further comprises an umbrella tool positioned within the hollow cylinder and configured to transition from an open position to a closed position, the umbrella tool comprising a central rod member with an expandable and collapsible frame attached to the central rod member.

11. A method comprising:
positioning a pair of ends of a hollow sealing sleeve on either side of a circumferential leak within a flowline, a pair of sealing elements attached to the pair of ends, the pair of sealing elements in a undeployed state, a deployment tool positioned within an inner volume defined by the sealing sleeve, the deployment tool configured to be retracted from the inner volume defined by the sealing sleeve, wherein the sealing sleeve comprises a first plurality of rollers attached to an outer surface of the sealing sleeve, wherein positioning the pair of ends of the sealing sleeve on either side of the circumferential leak within the flowline comprises guiding, using the first plurality of rollers, movement of the sealing sleeve within the flowline responsive to fluid flow within the flowline until the plurality of rollers are positioned on either side of the circumferential leak within the flowline;
retracting the deployment tool from the inner volume defined by the sealing sleeve; and
transitioning, by the deployment tool and in response to the retracting, the pair of sealing elements from the undeployed state to a deployed state to seal the pair of ends to the inner wall of the flowline on either side of the circumferential leak.

12. The method of claim 11, further comprising removing the deployment tool from the flowline after retracting the deployment tool from the inner volume defined by the sealing sleeve.

13. The method of claim 12, wherein fluid flow through the flowline is temporarily stopped in response to identifying the circumferential leak, wherein the method further comprises, after removing the deployment tool from the flowline, re-starting fluid flow through the inner volume defined by the sealing sleeve.

14. The method of claim 11, wherein transitioning the pair of sealing elements from the undeployed state to the deployed state comprises expanding the pair of sealing elements radially.

15. The method of claim 11, wherein a pair of activating arms are attached to each end of the pair of ends, respectively, each activating arm facing in a first direction within the flowline when the pair of sealing elements is in the undeployed state, each activating arm configured to be shifted from the first direction to a second, opposite direction within the flowline, wherein transitioning the pair of sealing elements from the undeployed state to the deployed state comprises shifting each activating arm from the first direction to the second, opposite direction.

16. The method of claim 15, wherein the deployment tool comprises a hollow cylinder and a pair of rings attached to the hollow cylinder and spaced apart by a distance equal to a distance between the pair of sealing elements, wherein shifting each activating arm comprises moving, by the pair of rings, the pair of activating arms from the first direction to the second, opposite direction when the deployment tool is retracted from the inner volume defined by the sealing sleeve.

17. The method of claim 11, wherein a slickline is connected to an end of the deployment tool, wherein retracting the deployment tool from the inner volume defined by the sealing sleeve comprises pulling the slickline to retract the deployment tool.

18. The method of claim 11, wherein the deployment tool comprises a second plurality of rollers attached to an outer surface of the deployment tool, wherein retracting the deployment tool from the inner volume defined by the sealing sleeve comprises guiding, by the second plurality of rollers, retraction of the deployment tool out of the inner volume defined by the sealing sleeve.

19. A method comprising:
   positioning a pair of ends of a hollow sealing sleeve on either side of a circumferential leak within a flowline, a pair of sealing elements attached to the pair of ends, the pair of sealing elements in a undeployed state, a deployment tool positioned within an inner volume defined by the sealing sleeve, the deployment tool configured to be retracted from the inner volume defined by the sealing sleeve;
   retracting the deployment tool from the inner volume defined by the sealing sleeve; and
   transitioning, by the deployment tool and in response to the retracting, the pair of sealing elements from the undeployed state to a deployed state to seal the pair of ends to the inner wall of the flowline on either side of the circumferential leak, wherein the sealing sleeve comprises a first plurality of rollers attached to an outer surface of the sealing sleeve, wherein positioning the pair of ends of the hollow sealing sleeve on either side of the circumferential leak within the flowline comprises moving the sealing sleeve within the flowline responsive to fluid flow within the flowline to be positioned on either side of the circumferential leak within the flowline.

20. The method of claim 19, wherein the deployment tool comprises a second plurality of rollers attached to an outer surface of the deployment tool, wherein retracting the deployment tool from the inner volume defined by the sealing sleeve comprises guiding movement of, by the second plurality of rollers, the deployment tool out of the inner volume defined by the sealing sleeve.

* * * * *